United States Patent [19]

Tubergen

[11] Patent Number: 5,421,967
[45] Date of Patent: Jun. 6, 1995

[54] CHEMICALLY MODIFIED ELECTRODES AND METHOD OF USING SAME IN REMOVING METALS FROM A FLUID

[75] Inventor: Karen R. Tubergen, Mount Prospect, Ill.

[73] Assignee: Nalco Chemical Company, Naperville, Ill.

[21] Appl. No.: 142,605

[22] Filed: Oct. 25, 1993

[51] Int. Cl.$^6$ .................................................. C02F 1/46
[52] U.S. Cl. ................... 204/141.5; 204/149; 204/229; 204/231; 204/275; 204/294
[58] Field of Search ................ 204/141.5, 149, 229, 204/231, 294, 275

[56] References Cited

U.S. PATENT DOCUMENTS

| | | | |
|---|---|---|---|
| 1,388,613 | 8/1921 | Simsohn | 204/229 |
| 3,219,564 | 11/1965 | Wilkinson | 204/231 |
| 4,135,995 | 1/1979 | Welch | 204/98 |
| 5,258,111 | 11/1993 | Karagozler et al. | 204/416 |
| 5,281,319 | 1/1994 | Kaneko et al. | 204/294 |

OTHER PUBLICATIONS

Skládal, *Determination of Organophosphate and Carbamate Pesticides Using a Cobalt Phthalocyanine-Modified Carbon Paste Electrode and a Cholinesterase Enzyme Membrane*, Analytica Chimica Acta, 252, pp. 11–15 (1991) (no month).

Halbert et al, *Electrocatalytic and Analytical Response of Cobalt Phthalocyanine Containing Carbon Paste Electrodes Toward Sulfhydryl Compounds*, Anal. Chem., 57, pp. 591–595, (1985) (no month).

Baldwin et al, *Chemically Modified Electrodes in Liquid Chromatography Detection: A Review*, Talanta, vol. 389, No. 1., pp. 1–16 (1991) (no month).

Wring et al, *Determination of Glutathione in Human Plasma Using High-Performance Liquid Chromatography With Electrochemical Detection With a Carbon—Epoxy Resin Composite Electrode Chemically Modified With Cobalt Phthalocyanine*, Analyst, vol. 114, pp. 1571–1573 (1989) (no month).

*Ion-Selective Electrode Methodology*, CRS Press, pp. 149–172 (1984) (no month).

Wring et al, *Development of an Improved Carbon Electrode Chemically Modified With Cobalt Phthalocyanine as a Re-usable Sensor for Glutathione*, Analyst, vol. 114, pp. 1563–1570 (1989) (no month).

Kulys et al, *Chemically Modified Electrodes for the Determination of Sulphydryl Compounds*, Analytica Chimica Acta, 232, pp. 287–292 (1991) (no month).

Wang, *Modified Electrodes for Electrochemical Detection in Flowing Streams*, Analytica Chimica Acta, 243, pp. 41–48 (1990) (no month).

Dong et al, *The Application of Chemically Modified Electrodes in Analytical Chemistry*, Electroanalysis, 1, pp. 99–106 (1989) (no month).

Primary Examiner—John Niebling
Assistant Examiner—Arun S. Phasge
Attorney, Agent, or Firm—Hill, Steadman & Simpson

[57] ABSTRACT

A chemically modified electrode is provided for selectively and sensitively detecting the presence of precipitant within wastewater. A system and a method, utilizing the chemically modified electrode, are provided to monitor and control feed of a precipitant to a reservoir containing a fluid, such as wastewater, with metals therein. The chemically modified electrode in conjunction with a reference electrode are provided in the reservoir for measuring current flowing therebetween. In response, the feed of the precipitant may be controlled to maintain the current within a predetermined range.

18 Claims, 5 Drawing Sheets

FIG. 3

ELECTRODE: $2I'' \longrightarrow I_2 + 2I''$

INTERFACE: $2 R_2N-\underset{\parallel}{C}-S'' + I_2 \longrightarrow R_2N-\underset{\parallel}{C}-S-S-\underset{\parallel}{C}-NR_2 + 2I'$
$\phantom{2 R_2N-}S \phantom{+ I_2 \longrightarrow R_2N-}S \phantom{-S-S-}S$

CHEMICALLY MODIFIED ELECTRODES AND METHOD OF USING SAME IN REMOVING METALS FROM A FLUID

BACKGROUND OF THE INVENTION

The present invention relates generally to the use of chemically modified electrodes. More particularly, the present invention relates to an improved treatment system and method for automatically controlling the chemical feed of dithiocarbamates ("DTC") in fluids, for example wastewater, containing metal ions so as to produce metal ion precipitation.

As a result of the continual contamination of rivers, waterways and the like by wastewater from industrial sources, the Environmental Protection Agency has enacted strict regulations in an attempt to stop such contamination. For instance, a mandatory requirement exists to control metals in wastewater below certain prescribed concentrations. Particularly stringent regulations have been established for heavy metals harmful to humans, such as mercury, cadmium, zinc, copper, lead, nickel and silver.

Due to the harmful effects caused by these metals, the EPA continually lowers the permissible discharge levels of metals in process wastewater streams. While many industries producing metal bearing liquid effluents still illegally discharge untreated waste effluents into streams and sewers, the stepped-up enforcement of such EPA standards coupled with excessive fines have persuaded those in the industry to finally cope with the problem of water contamination. The two major methods for complying with metal discharge regulations are the storage and transport of untreated, unconcentrated waste to hazardous waste disposal sites, or, alternatively, on-site treatment. Storage and transport of waste is very expensive for all but the very small volume waste producers. Thus, the only economical alternative for the majority of the industry is on-site treatment.

On-site treatment is an effective means for ensuring compliance with disposal regulations. The most viable chemical techniques for on-site treatment of metal bearing effluents include electrolytic deposition, metallic replacement, ion exchange, chemical reduction and chemical precipitation. While electrolytic deposition, metallic replacement, ion exchange and chemical reduction are all reasonably effective means, chemical precipitation is believed to be the most effective method for removal of metals from wastewater effluents.

Chemical precipitation involves the addition of a precipitant into the wastewater causing metal ion precipitation. Naturally, a treatment scheme that supplies an appropriate amount of the precipitant to the wastewater will be an effective on-site treatment. However, without the use of some type of control feed system, over-feeding of the precipitant can easily occur. Such over-feeding is one of the major problems the industry must face when utilizing a chemical precipitation system.

Oxidation reduction potential ("ORP") electrodes and ion-selective electrodes are both known for assisting in automating chemical feed control and continuous metal ion precipitation processes by monitoring the electrochemical potential therein. Although these electrodes have provided a means to control precipitant feed, disadvantages exist with both types of electrodes.

Oxidation reduction potential electrodes are disadvantageous for at least two reasons. First, ORP probes are non-specific. ORP electrodes are typically made from gold or platinum and measure a voltage difference (potential) between itself and a reference electrode. They respond to the presence of metal ions, but also respond to a multitude of electrochemically-active components that may be present in the wastewater. Such components may include hydrated or chelated metal ions, oxidants (hypochlorite), or reducing agents (bisulfite). These components contribute to an observed cumulative potential, thereby making the monitoring of a single component, such as the disappearance of a particular metal ion, impractical.

Second, ORP probe measurements are sensitive to pH fluctuations in process streams. This sensitivity occurs because hydromium ions (H+) are often involved in the oxidation or reduction reactions occurring in aqueous systems. Moreover, the lack of knowledge of the actual reactions occurring at the electrode surface makes it impossible to predict the effect of pH on the measured potentials.

Although ion-selective electrodes provide an alternative to oxidation reduction electrodes, these electrodes possess similar problems as those associated with the ORP probes. An ion-selective electrode often used in the treatment of wastewater is a sulfide electrode. While the sulfide electrode provides a means to control precipitant feed, a system incorporating such a sulfide electrode is only responsive to the presence of excess sulfide that does not always allow for accurate detection in resulting precipitant feed. Such ion-specific electrodes are known to plateau under precipitant over-feed conditions. Thus, similar to the oxidation reduction electrode, precipitant over-feed may occur without viable detection.

Still further, ion-selective electrodes, similar to the oxidation reduction electrodes, are potentiometric detection methods. A potentiometric mode measures a cumulative potential based upon components within a solution. Since these electrodes measure a cumulative potential, a variety of common interferents to these electrodes, such as metal sulfide complexes, will obstruct the detection of a particular precipitant.

Therefore, a need exists for an improved selective controlling device, as well as system incorporating same, for optimizing the control of metal precipitant feed in wastewater streams.

SUMMARY OF THE INVENTION

The present invention provides a system and method for monitoring and controlling feed of a precipitant to a reservoir containing fluids, such as wastewater. Pursuant to the present invention, a chemically modified electrode and a reference electrode are provided in the reservoir for measuring current flowing through the electrodes as a function of concentration. Unlike with ORP probes, in the present invention, the chemically modified electrodes are used to facilitate the measurement of the limiting current flowing through the electrode system at a fixed applied potential.

In an embodiment, the chemically modified electrode is a carbon paste electrode modified with a catalytic modifier. The modified carbon paste electrode includes a mixture of graphite powder and sufficient iodine to allow the iodine to act as a catalytic modifier.

The present invention provides a system for removing metals from a fluid. The system comprises a reservoir for receiving the fluid therein. In addition, a precipitant feed unit feeds a precipitant into the reservoir. A chemically modified electrode and a reference electrode are disposed in the reservoir for measuring the current at a specific potential. A controller responds to the measured current for automatically controlling feed of the precipitant to the reservoir.

In an embodiment, the controller of the system feeds the precipitant to maintain the current within a predetermined range.

In an embodiment, the fluid in the system is wastewater.

In an embodiment, the system further includes a counter electrode. The counter electrode minimizes the current passing through the reference electrode.

The present invention also provides a method for removing metals from fluids. The method comprises providing fluids from a source to a reservoir, providing a chemically modified electrode and a reference electrode for measuring a current at a defined potential and feeding a precipitant into the reservoir.

In an embodiment, the precipitant is a dialkyldithiocarbamate.

In an embodiment, the chemically modified electrode is a carbon paste electrode having a body packed with a mixture including graphite powder and sufficient iodine to allow the iodine to act as a catalytic modifier.

In an embodiment, the method of the present invention further includes controlling the feed rate of the precipitant into the reservoir. The feed rate is controlled to maintain current within a predetermined range.

In an embodiment, the method of the present invention further includes the step of providing a counter electrode to facilitate the measuring of the current flowing through a three-electrode arrangement.

An advantage of the present invention is that it provides an electrode that can selectively detect the concentration of a precipitant within a wastewater stream.

Another advantage of the present invention is that it provides a chemically modified electrode with increased sensitivity over previously used ion-selective electrodes and oxidation reduction electrodes. The electrodes of the present invention are amperometric current measuring probes. The increased sensitivity of the electrode is due primarily to the fact that the detection mode for the present invention is amperometric. In this regard, since only a single potential is selected for current analysis, the electrode of the present invention also screens out many potential interferences. Only those species that are electro-active at the selected potential will be observed.

Another advantage of the present invention is that it provides a system and method for removing metals from a fluid by measuring current flowing across the electrodes of the system at a specific electrochemical potential.

Likewise, a further advantage of the present invention is that it provides a system and method for controlling feed of a precipitant to the fluid based on a predetermined range for the current flowing across the electrodes.

Still further, an advantage of the present invention is that it provides an improved system and method for automatically controlling the feed rate of precipitant to the reservoir containing the fluid.

Additional features and advantages of the present invention are described in, and will be apparent from, the detailed description of the presently preferred embodiment and the drawings.

BRIEF DESCRIPTION OF THE DRAWINGS

FIG. 3 illustrates an electrochemical mechanism of a chemically modified electrode made in accordance with the present invention.

DETAILED DESCRIPTION OF THE PRESENTLY PREFERRED EMBODIMENTS

The present invention provides a chemically modified electrode that may be used in a system for controlling feed of a precipitant to a reservoir containing a fluid having metals therein. The chemically modified electrode provides a selective as well as sensitive means for detecting the precipitant within the fluid. The present invention also provides a method for controlling feed of a precipitant to a reservoir containing a fluid having metals therein. Although the invention will be described hereinafter with reference to treatment of wastewater as the fluid, understandably any fluid, such as raw water and the like, containing metals, metal ions or other similar contaminants therein are within the scope of the invention.

Figure 1:
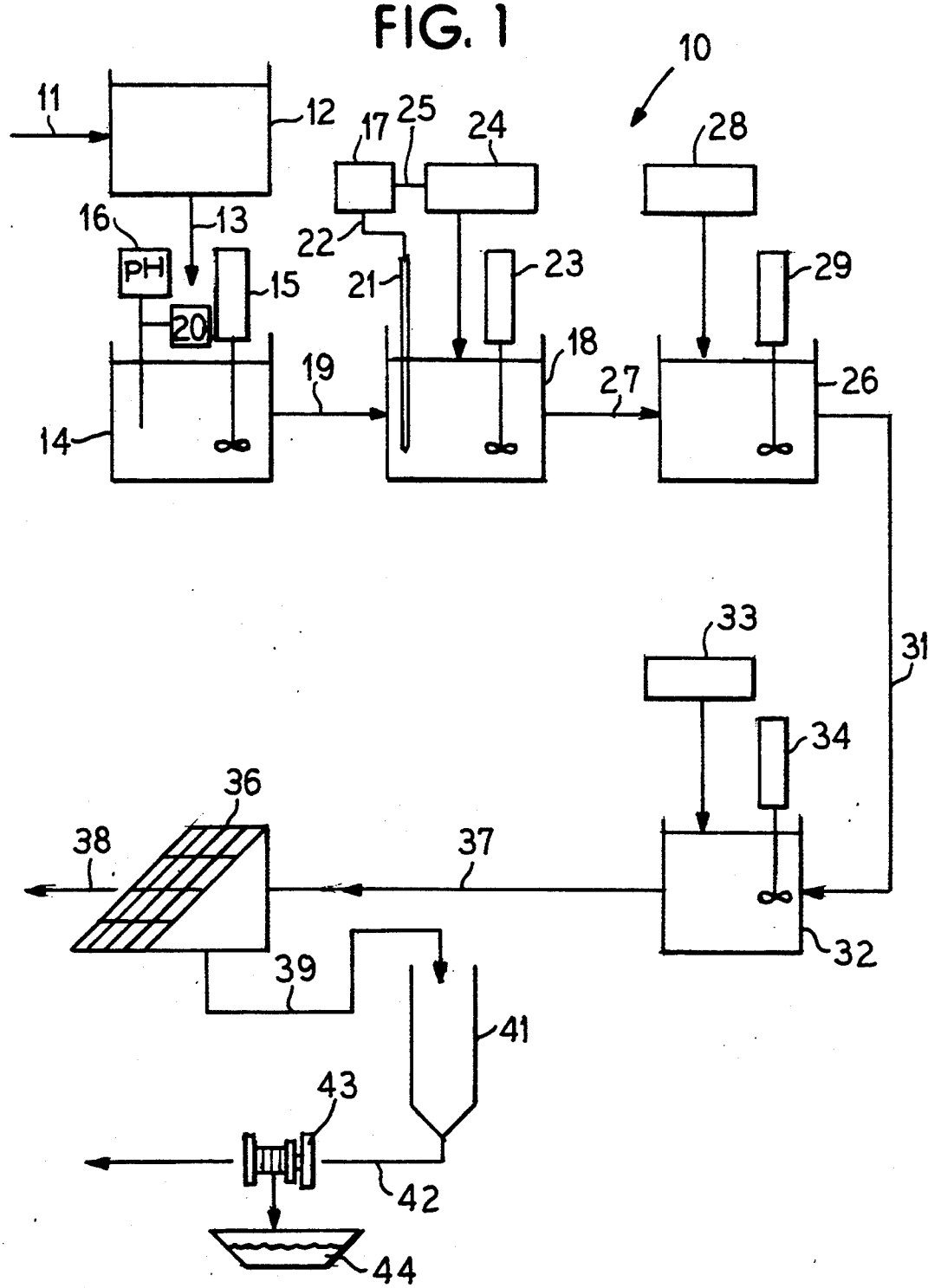
FIG. 1 illustrates a schematic diagram of a system for chemical precipitation and removal of metals in a continuous treatment process, constructed in accordance with the principles of the present invention.

Referring now to the drawings, FIG. 1 illustrates an improved treatment system 10 and methods for removal of metal ions from wastewater, constructed in accordance with the principles of the present invention. An electrode arrangement and controller system is used for automatically controlling the chemical feed of organic precipitant products in the wastewater so as to produce metal ion precipitation in a continuous treatment process. The system 10 includes an equalization tank 12, where wastewater from different streams containing dissolved metals to be treated is pumped into it via an inlet conduit 11 on a continuous basis. The equalization tank 12 allows for the combination of various streams.

The system 10 also includes a neutralization tank 14 that is connected to an outlet conduit 13 of the equalization tank 12. A pH monitor 16 is disposed in the neutralization tank 14 and is attached to a control unit 20 for controlling the pH of the wastewater precipitant for optimum product performance. A variable speed mixer 15 is also included to provide for adequate mixing of the wastewater in the neutralization tank 14. The neutralization tank 14 allows for the control of the pH in the range of approximately 6-12. The pH is adjusted by addition of a basic solution or an acidic solution to maintain the appropriate pH depending on the specifics of the wastewater to be treated.

A precipitation tank 18 is connected to the neutralization tank 14 via a connection conduit 19 and includes an electrode arrangement 21 disposed therein. The electrode arrangement 21 is a combination of a chemically modified electrode and a reference electrode. In an embodiment, the electrode arrangement 21 further includes a counter electrode. The counter electrode minimizes the current flowing between the reference electrode and the chemically modified electrode.

The chemically modified electrode ("CME") is made by deliberately altering the electrode surface with a selected modifier. The modifier chosen depends on the particular precipitant that is to be detected. Likewise, the optimal amount of modifier depends on the particular precipitant to be detected. In an embodiment, the amount of modifier present ranges from about 0.5 wt % to 2.0% wt. In a preferred embodiment, the amount of modifier present is 1% by weight.

The response obtained with the CME has two completely separate components: (1) the usual electrochemical component determined by the potential at which the electrode is maintained instrumentally; and (2) an additional chemical component determined by the reactivity of the modifier. In an embodiment, the precipitant is a dialkyldithiocarbamate and the modifier is iodine.

In general, a chemically modified electrode may operate by one of three methods: electrocatalysis, pre-concentration, and/or exclusion of interferents from the electrode surface. The basis of operation for the CMEs of the present invention is electrocatalysis. The catalytic CMEs of the present invention rely on the surface immobilization of an appropriate redox mediator. The role of the modifier is to mediate the electron transfer between the analyte (i.e. the precipitant in wastewater stream) and the electrode. Such an electrocatalytic scheme for an oxidation process is as follows:

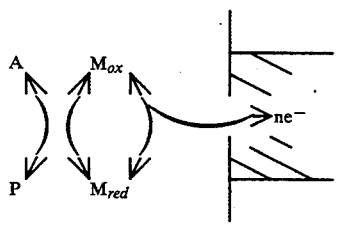

where A=analyte; P=product; and $M_{ox}$ and $M_{red}$ are the oxidized and reduced forms of the mediator, respectively.

The reaction sequence may be summarized by:

$$A + M_{ox} \rightarrow P + M_{red}$$

with subsequent reoxidation of $M_{red}$ (by the electrode) to form the active mediator $M_{ox}$. The net result of the electron shuttling is lowering of the overpotential to the formal potential of the mediator and an increase in current density. This acceleration of desired reactions offers a significant lowering of the detection limits and improved selectivity for a given precipitant.

As those skilled in the art will appreciate, while the present description focuses on electrocatalysis, the present invention is intended to also encompass the other forms of operation. Naturally, the selected form of operation depends on the particular type of detection desired.

By way of example, and not limitation, an example of a chemically modified electrode that may be used in the present invention will now be given.

The modified carbon pastes were prepared by first thoroughly mixing graphite powder (325 mesh, ultra F purity) with the desired weight percent of modifier. In an embodiment, a 1% by weight/weight of the modifier was mixed with the graphite powder. Each batch, with or without modifier, was prepared on a 2.00 gram total weight scale. To this mixture, a spectroscopic grade mineral oil was added and the mixture mulled until a paste was obtained having a consistency similar to peanut butter. In an embodiment, 1.2 mL of spectroscopic grade mineral was added to the mixture.

The chemically modified electrodes were prepared by packing the modified carbon paste into a well (3 mm diameter) of a electrode body, ensuring that no holes or channels existed. The electrodes were finished to a smooth surface by gently rubbing in a circular motion on high quality, white paper. Excess carbon paste adhering to the electrode body was removed with a tissue prior to data collection. After each voltammetric scan, renewal of the electrode surface was accomplished by removing the top layer (approximately 1 mm) of paste, replenishing it with a fresh portion of modified carbon paste, and surface smoothing as described above.

Electrochemical measurements were made with a three electrode cell (Ag/AgCl reference; Pt wire counter; modified carbon paste working) using normal cyclic voltametric techniques. The typical voltammogram was recorded from $-0.500$ V to $+1.00$ V. Sample solutions were prepared in 0.1M sodium phosphate (pH 8.0) buffer and in some instances purged with nitrogen prior to measurement. All potentials were reported relative to the Ag/AgCl reference electrode.

Figure 2:
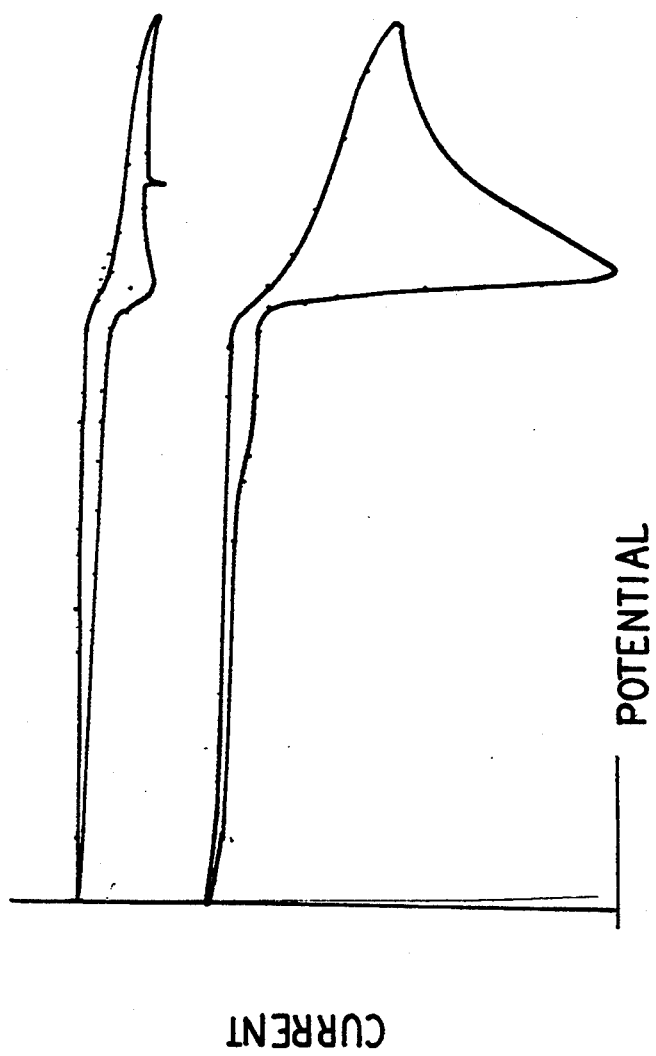
FIG. 2 illustrates a voltammogram for dimethyldithiocarbamate using a modified carbon paste electrode.

FIG. 2 illustrates the voltammetric response for dimethyldithiocarbamate using a chemically modified electrode made in accordance with the present invention. Specifically, the chemically modified electrode of FIG. 1 consists of a 1% iodine modified carbon paste electrode in a 0.10M sodium phosphate buffer, pH 8. For such electrode, an oxidation is prevalent at +525 mV (Ag/AgCl) for the redox equation:

$$2I^- \rightarrow I_2 + 2e^-$$

The re-reduction of $I_2$, although less prevalent, is observed at +460 mV. The lower voltammogram was obtained using the chemically modified electrode in a $10^{-3}$M dimethyldithiocarbamate solution. The substantial increase in anodic current results from the regeneration of the iodide ion upon the oxidation of the dimethyldithiocarbamate to the bis(dimethylthiocarbamoyl) disulfide by iodine. This type of electrochemical response is associated with an electrochemical mechanism, as illustrated in FIG. 3.

Figure 4:
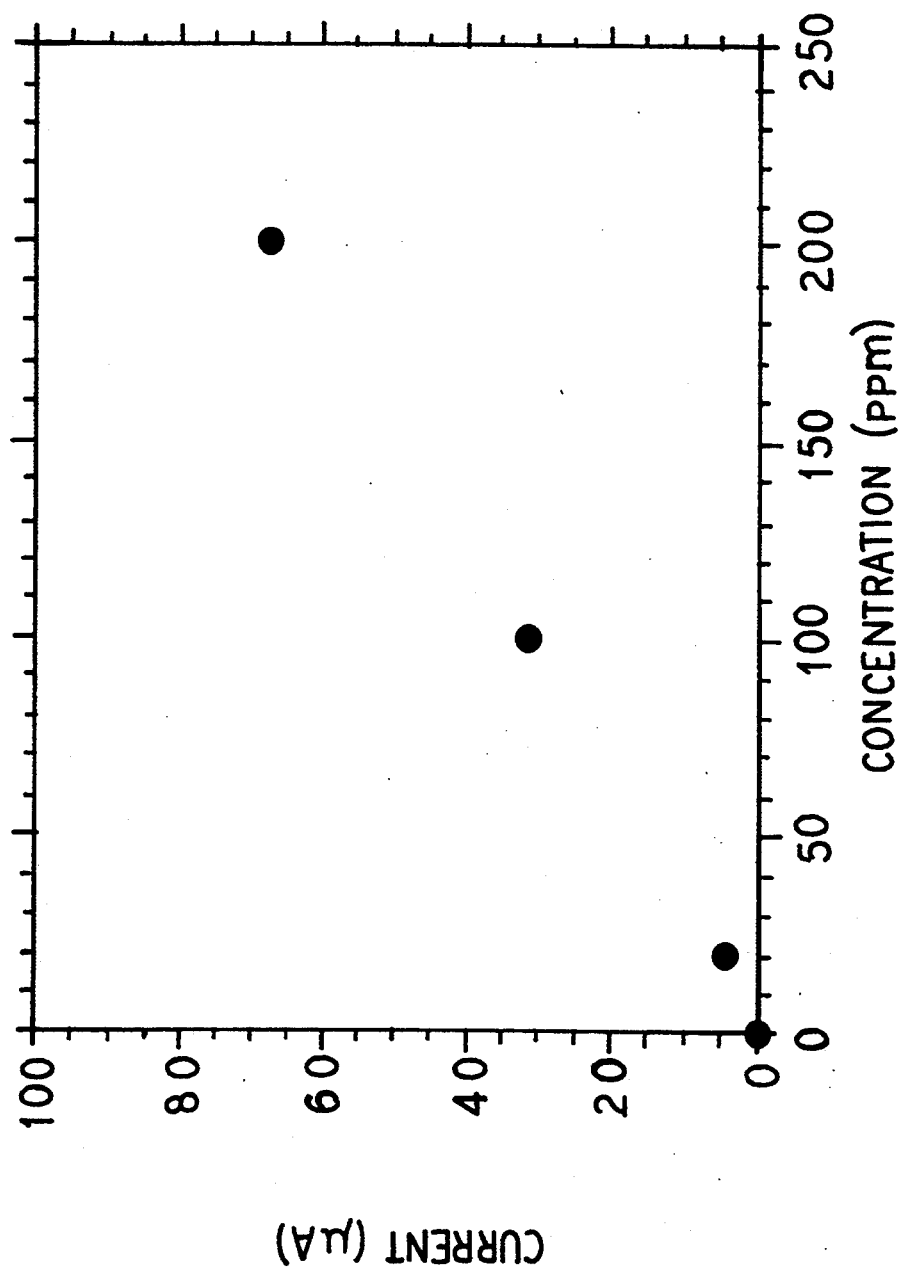
FIG. 4 illustrates a graph of the current versus concentration measured in a system utilizing an iodine chemically modified electrode in the presence of dimethyldithiocarbamate.

To determine the working range of this chemically modified electrode, various solution concentrations of dimethyldithiocarbamate were prepared. The observed currents were plotted as a function of concentration. FIG. 4 illustrates the measurement of the current flowing through the electrode arrangement 21, using a 1% iodine modified CME, as a function of dithiocarbamate concentration. The graph shows that the current is directly proportional to the dithiocarbamate concentration between 0 and 200 ppm. Higher concentrations were not examined simply because such excessive metal precipitant would likely not be encountered in wastewater streams.

Three other dithiocarbamates were examined for their detection using the iodine modified electrode. Diethyldithiocarbamate, 200 ppm in 0.1M sodium phosphate, pH 8, yielded currents similar to those observed for the dimethyl derivative. Diphenyldithiocarbamate, 200 ppm also in phosphate buffered, did not respond in a catalytic manner. Notably, however, the solution became cloudy upon standing, perhaps indicating an instability problem of the compound. The cloudy solution was also observed previously with a mixture of dimethyldithiocarbamate and ethylenebis dithiocarbamate. Similarly, in the latter case, no electro catalytic activity was observed with the iodine CME.

As stated previously, an often cited concern with ORP problems and ion-selective probes is the problem of interferents. Wastewaters from industry operations contain a host of substances that could potentially interfere with an electrochemical probe. In light of these concerns, experiments were conducted to determine whether various interferents would hinder the performance of the chemically modified electrode of the present invention.

Figure 5:
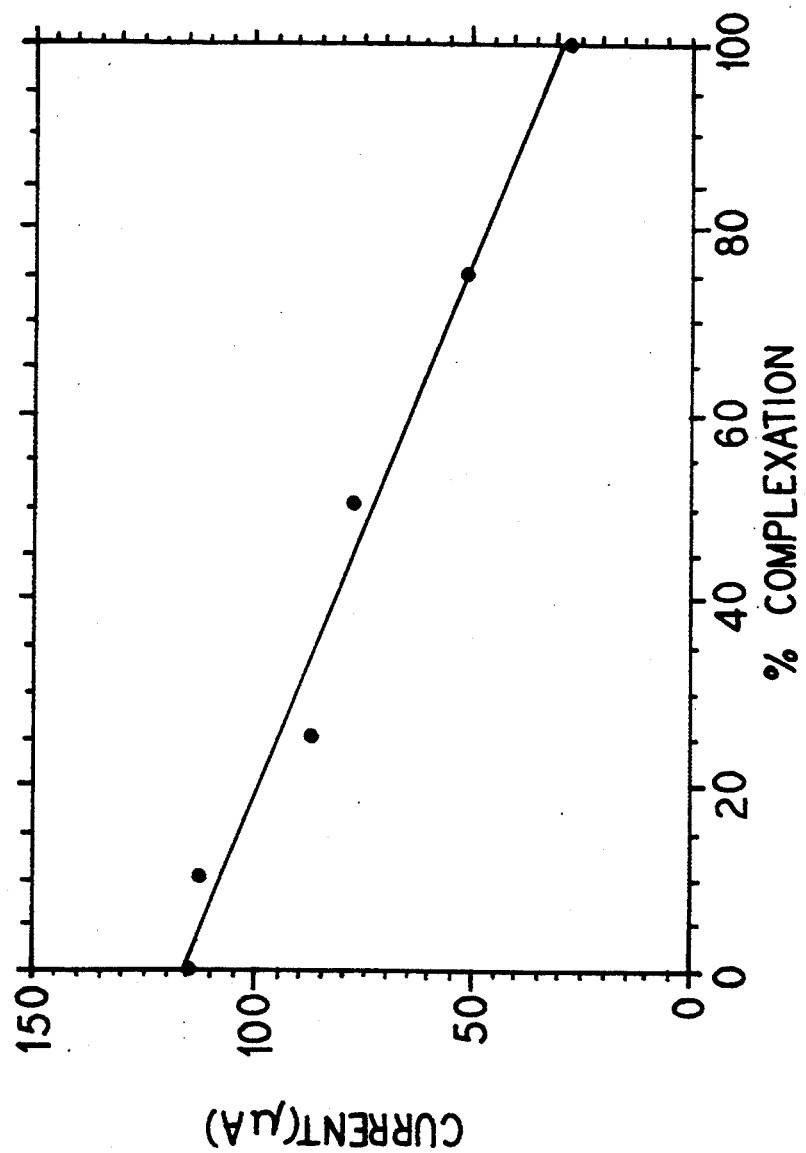
FIG. 5 illustrates a plot of expected percent complexation of the DTC versus the observed current for the catalytic $2I^-/I_2$ redox.

A common wastewater component, such as copper complexes, did not interfere with the detection of dimethyldithiocarbamate using the iodine CME. A stock copper solution (as copper citric complex) was prepared such that small additions to a known concentration of DTC would stoichiometrically complex the available DTC. A plot of the expected percent complexation of the DTC versus the observed current for the catalytic $2I^-/I_2$ is illustrated in FIG. 5. As the amount of copper metal ion was increased, the observed current decreased indicating that some of the free dithiocarbamate was being consumed. This decrease occurred in a linear fashion (corr. coeff. 0.99). At 100% theoretical DTC complexation some residual current was observed. This current was attributed to the immobilized iodine of the CME.

Likewise, oxygen, another common interferent in electrochemical measurements, did not interfere with the catalytic process between the iodine CME and the DTC solution. Voltammetric measurements were made in both nitrogen purged and unpurged DTC solutions. The data in Table 1 suggests that, even under non-ideal electrode conditions, oxygen did not interfere with the proper functioning of the iodine CME.

TABLE 1

| $I_2$ Loading | [wt %] $(CH_3)_2DTC$[ppm] | Current [uA][a] | Rel. % Error |
|---|---|---|---|
| 1.0 | 0 | 4.25 ± 0.57 (7) | 9.1 |
| 0.75 | 0 | 3.93 ± 0.47 (9) | 12.0 |
| 1.0 | 20 | 14.40 ± 1.60 (10) | 11.1 |
| 1.0 | 200 | 86.25 ± 4.49 (10) | 5.2 |
| 0.75 | 20 | 9.94 ± 0.35 (8) | 3.6 |
| 0.75[b] | 20 | 9.92 ± 0.36 (6) | 3.6 |

[a]Parentheses contain the number of voltammograms used to determine the mean and standard deviation.
[b]These values were obtained without purging the system with oxygen.

Referring again to the system 10 illustrated in FIG. 1, the electrode 21 is connected via lead line 22 to a controller unit 17. The controller unit 17 is connected to a precipitant feed unit 24 by means of a lead line 25. In an embodiment, the precipitant is a dithiocarbamate (DTC).

A variable speed mixer 23 is also disposed within the precipitation tank 18 to allow for proper mixing of the wastewater with the added precipitant. The chemically modified electrode monitors the concentration of the precipitant within the wastewater. The complete reaction of the precipitant in soluble metal ions in the wastewater results in the formation of an insoluble metal-precipitant complex. The presence of unreacted precipitant is due to both the incomplete reaction with metal ions in the wastewater and product over-feed. The presence of metal ions is due to precipitant under-feed or inadequate reaction time.

As further illustrated in FIG. 1, a coagulation tank 26 is also included in the system 10 and is connected to the precipitation tank 18 via a connection conduit 27. A coagulant is added to the wastewater by a coagulant feed unit 28. The wastewater in the coagulant tank 26 is subjected to low-energy mixing by a variable speed mixer 29 to facilitate complete mixing of the coagulant with the fluid.

A flocculation tank 32 is also included in the system 10 and is connected to the coagulation tank 26 via a connection pipe 31. A flocculent is added to the wastewater by a flocculent feed unit 33. The wastewater in the flocculation tank 32 is subjected to a low-energy mixing by a variable speed mixer 34 to encourage further flocculation of the precipitated-metal complex.

A clarifier 36 is connected to the flocculation tank 32 via a connection pipe 37. Floc settles to the clarifier 36 and clear effluent overflows a weir (not shown) at the top of the clarifier 36. The clarifier 36 discharges the final effluent to a public municipal sewer at the outlet 38.

One example of a sludge removal apparatus that may be used in the present invention includes a cone-bottom tank 41. The cone-bottom tank 41 is connected to the bottom of the clarifier 36 via a connection conduit 39 for collection and thickening of sludge therefrom. A filter press 43 is connected via a connection conduit 42 to a tank 41 to provide for further dewatering of the sludge. The dewatered sludge is periodically dropped into a hopper 44 and then sent to a sludge drier (not shown). The dried sludge is finally carried off to a landfill off-site.

As the foregoing detailed description illustrates, the present invention provides an improved electrode to be used in a wastewater treatment system for the controlling of chemical feed in wastewater containing metal ions, so as to produce metal ion precipitation. The present invention also provides an improved wastewater treatment system. The system of the present invention includes a chemically modified electrode in combination with a reference electrode disposed in a precipitation tank for measuring a current therebetween in a predetermined range. A controller unit is responsive to the current in the predetermined range and automatically controls the chemical precipitant feed from the precipitant feed unit in the precipitation tank.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

We claim:

1. A system for removing metals from a fluid comprising:

a reservoir for receiving the fluid therein;

a precipitant feed unit for feeding a precipitant into the reservoir;

a carbon paste electrode modified with an effective amount of iodine to allow the iodine to act as a catalytic modifier and a reference electrode disposed in the reservoir for measuring a current therebetween; and a controller responsive to the measured electrochemical potential for automatically controlling feed rate of the precipitant to the reservoirs.

2. The system of claim 1 wherein the controller feeds the precipitant to maintain the current within a desired range.

3. The system of claim 1 wherein the reservoir is a wastewater reservoir.

4. The system of claim 1 wherein the precipitant feed unit is a dialkyldithiocarbamate precipitant feed unit.

5. The system of claim 1 wherein the amount of iodine present in the chemically modified electrode ranges from about 0.5 to 2.0 wt. %.

6. The system of claim 1 further including a counter electrode to minimize the current flowing through the reference electrode.

7. A method for removing metals from a fluid comprising the steps of:

providing the fluid from a source to a reservoir;

providing a chemically modified electrode and a reference electrode in the reservoir for measuring a current therebetween; and feeding a dialkyldithiocarbamate into the reservoir.

8. The method of claim 7 wherein the fluid is wastewater.

9. The method of claim 7 further comprising the step of:

controlling feed rate of the precipitant into the reservoir.

10. The method of claim 9 wherein the feed rate is controlled to maintain the current within a desired range.

11. The method of claim 7 further including the step of providing a counter electrode to facilitate the measuring of the current.

12. The method of claim 7 wherein the chemically modified electrode is a carbon paste electrode modified with an effective amount of iodine to allow the iodine to act as a catalytic modifier.

13. A method for removing metals from a fluid comprising the steps of:

providing the fluid from a source to a reservoir;

providing a carbon paste electrode modified with an effective amount of iodine to allow the iodine to act as a catalytic modifier and a reference electrode in the reservoir for measuring a current therebetween; and feeding a precipitant into the reservoir.

14. The method of claim 13 wherein the fluid is wastewater.

15. The method of claim 13 wherein the precipitant is a dialkyldithiocarbamate.

16. The method of claim 13 further comprising the step of:

controlling feed rate of the precipitant into the reservoir.

17. The method of claim 16 wherein the feed rate is controlled to maintain the current within a desired range.

18. The method of claim 13 further including the step of providing a counter electrode to facilitate the measuring of the current.

* * * * *